United States Patent
Uemura et al.

(10) Patent No.: US 6,568,468 B1
(45) Date of Patent: May 27, 2003

(54) AIR CONDITIONING APPARATUS FOR VEHICLE

(75) Inventors: Yukio Uemura, Owariasahi (JP); Kazushi Shikata, Kariya (JP); Takuya Natsume, Kariya (JP); Hikaru Sugi, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/056,441

(22) Filed: Apr. 7, 1998

(30) Foreign Application Priority Data

Apr. 7, 1997 (JP) .............................................. 9-088287
Dec. 17, 1997 (JP) .............................................. 9-348232
Feb. 25, 1998 (JP) ............................................. 10-043873

(51) Int. Cl.[7] .......................... F25B 29/00; B60H 1/00
(52) U.S. Cl. ......................... 165/203; 165/42; 165/43; 165/204; 165/103; 237/12.3 A; 237/12.3 B; 454/156; 454/160; 454/161; 454/126; 454/121; 251/901
(58) Field of Search ............................ 165/42, 43, 203, 165/204, 103; 237/12.3 A, 12.3 B; 454/156, 160, 161, 121, 126; 251/901

(56) References Cited

U.S. PATENT DOCUMENTS 3,948,312 A * 4/1976 Nisbet ........................ 165/204
4,157,113 A * 6/1979 Karran et al. ................. 165/42
4,513,808 A * 4/1985 Ito et al. ....................... 165/43
4,791,981 A   12/1988 Ito
4,829,884 A * 5/1989 Kagohata ...................... 165/43
5,154,223 A * 10/1992 Ishimaru et al. ............ 454/126
5,901,943 A * 5/1999 Tsunoda ..................... 454/121

FOREIGN PATENT DOCUMENTS

JP            0186512   * 11/1982   ................. 165/43
JP          A-3-189225     8/1991
JP          A-5-278448    10/1993

* cited by examiner

Primary Examiner—John K. Ford
(74) Attorney, Agent, or Firm—Harness, Dickey & Pierce, PLC

(57) ABSTRACT

In an air conditioning apparatus for a vehicle, a first cool air bypass passage is provided at an upper side of a heater core, and a second cool air bypass passage is provided at a lower side of the heater core. Cool air from the first cool air bypass passage and warm air having passed through the heater core are mixed in a first air mixing chamber, and a ratio between an amount of cool air and an amount of warm air is adjusted by an air mixing film member. Further, cool air from the second cool air bypass passage and warm air from the heater core are mixed in a second air mixing chamber, a ratio between an amount of cool air and an amount of warm air is adjusted by an air mixing door, and the second air mixing chamber is provided at an immediately downstream air side of the heater core. Thus, in the air conditioning apparatus, a pressure loss in a ventilation system can be reduced.

10 Claims, 9 Drawing Sheets

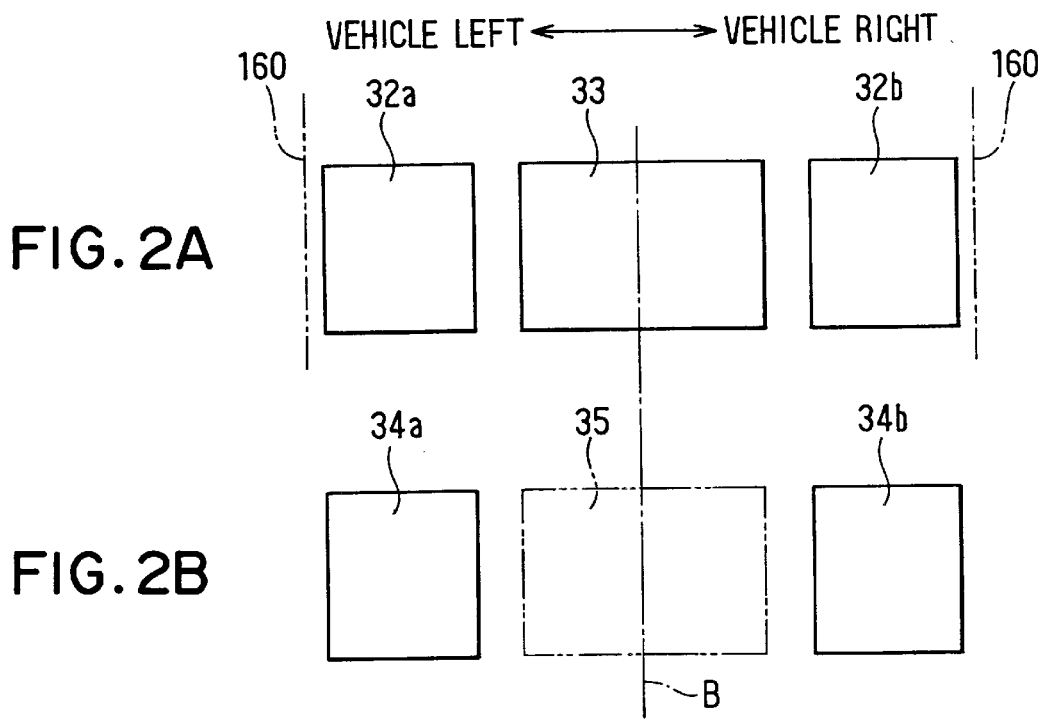
FIG. 2A
FIG. 2B
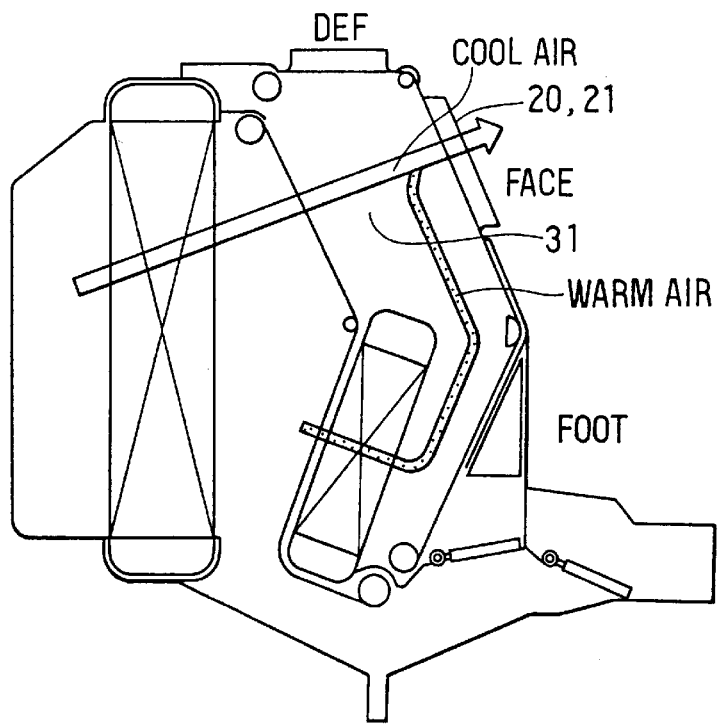
FIG. 3

AIR CONDITIONING APPARATUS FOR VEHICLE

CROSS-REFERENCE TO RELATED APPLICATION

This application is related to and claims priorities from Japanese Patent Application No. Hei. 9-88287 filed on Apr. 7, 1997, No. Hei. 9-348232 filed on Dec. 17, 1997, and No. Hei. 10-43873 filed on Feb. 25, 1998.

BACKGROUND OF THE INVENTION

1. Field of the Invention

The present invention relates to an air conditioning apparatus for a vehicle, which controls a temperature of air blown toward a passenger compartment by adjusting a ratio between an amount of cool air and an amount of warm air, while decreasing a pressure loss in a ventilation system.

2. Description of Related Art

In a conventional air conditioning apparatus, an air conditioning unit including an evaporator, a heater core and an air outlet mode selecting mechanism is disposed in a front portion of a passenger compartment at an approximate center position in a left-right direction of the vehicle, and a blower unit for blowing air toward the air conditioning unit is disposed at an offset position of the air conditioning unit in the left-right direction. Warm air having passed through the heater core and cool air bypassing the heater core are mixed in an air mixing chamber, and the ratio between the amount of warm air and the amount of cool air is adjusted by an air mixing door. A defroster opening portion for blowing conditioned air toward an inner surface of a windshield of the vehicle is provided at an upper side of an air conditioning case of the air conditioning unit, a foot opening portion for blowing conditioning air toward the foot portion of a passenger in the passenger compartment is provided at a lower side of the air conditioning case, and a face opening portion for blowing conditioning air toward the head portion of the passenger in the passenger compartment is provided at an upper side of the air conditioning case.

In the conventional air conditioning apparatus, to obtain cool capacity for rapidly cooling the passenger compartment in the summer, a cool air bypass passage, the air mixing chamber and the face opening portion are communicated with each other in an approximate straight line to have a small bent portion. Therefore, in a face mode, a pressure loss of a ventilation system of the air conditioning unit can be decreased to increase the cooling capacity for the passenger compartment. Thus, the air mixing chamber is usually disposed at an upper side of the air conditioning unit (i.e., at an inlet portion of the face opening portion).

However, in the conventional air conditioning apparatus, because cool air and warm air are always mixed in the air mixing chamber even when any one of the defroster opening portion, the foot opening portion and the face opening portion are opened, the pressure loss of the ventilation system becomes large in a foot mode where the foot opening portion is opened. Because the pressure loss in the ventilation system becomes larger, the blower unit becomes larger, and air-blowing noise also becomes larger.

To overcome the above-described problem, in an air conditioning apparatus described in U.S. Pat. No. 4,791,981, an air mixing chamber is provided in each of inlet sides of the face opening portion and the foot opening portion, and the temperature of air to be blown toward the face opening portion and the temperature of air to be blown toward the foot opening portion are respectively independently controlled. However, in the air conditioning apparatus, a heating heat exchanger is disposed vertically at a downstream air side of a cooling heat exchanger, and air having passed through the cooling heat exchanger is largely bent around the heating heat exchanger. Therefore, the pressure loss in the ventilation system is also increased. Further, in the air conditioning apparatus, there is not indicated a temperature control of air blown toward a rear seat side in the passenger compartment and a pressure loss in an air passage for the rear seat side in the passenger compartment.

SUMMARY OF THE INVENTION

In view of the foregoing problems, it is a first object of the present invention to provide an air conditioning apparatus for a vehicle, which controls a temperature of air to be blown toward a passenger compartment by adjusting a ratio of an amount of cool air and an amount of warm air, while decreasing a pressure loss in a ventilation system.

It is a second object of the present invention to provide an air conditioning apparatus for a vehicle, which controls a temperature of air to be blown toward a passenger compartment by adjusting a ratio of an amount of cool air and an amount of warm air, while decreasing a size of the apparatus.

It is a third object of the present invention to provide an air conditioning apparatus for a vehicle, which can control a temperature of air to be blown toward a rear seat side in a passenger compartment, and can decrease a pressure loss in an air passage through which air is blown toward the rear seat side in the passenger compartment.

According to a first aspect of the present invention, in an air conditioning apparatus for a vehicle, air from a first bypass passage and air from a heating heat exchanger are adjusted by a first air mixing unit and are mixed in a first air mixing chamber, and the mixed air is blown toward a face opening portion or a defroster opening portion. Further, air from a second bypass passage and air from the heating heat exchanger are adjusted by a second air mixing unit and are mixed in a second air mixing chamber, and the mixed air is blown toward a foot opening portion. Thus, by respectively providing the face opening portion and the foot opening portion to be respectively adjacent to the first air mixing chamber and the second air mixing chamber, the face opening portion and the foot opening portion can be separated from each other to respectively increase the opening areas of the face opening portion and the foot opening portion. Each of a cooling heat exchanger and the heating heat exchanger is disposed in such a manner that air passes through the heat exchangers from a front side to a rear side of the vehicle, and each of the first air mixing unit and an air outlet mode selecting unit is a film member sliding in an un-down direction of the vehicle. Thus, a size of the air conditioning apparatus in a front-rear direction of the vehicle is reduced. Further, because the second air mixing chamber is provided at an immediately downstream air side of the heating heat exchanger, air having passed through the heating heat exchanger can approximately linearly flow into the second air mixing chamber at a side of the foot opening portion. Thus, an air passage for leading air toward the foot opening portion can be greatly reduced. As a result, in a face mode, the pressure loss in the air passage becomes smaller to increase the amount of air blown toward the passenger compartment; and therefore, a blower unit can be made smaller to reduce an air-blowing noise.

According to a second aspect of the present invention, in an air conditioning apparatus for a vehicle, air from a first bypass passage and air from a heating heat exchanger are mixed in a first air mixing chamber for blowing the mixed air toward a front face opening portion, air from a second bypass passage and air from the heating heat exchanger are mixed in a second air mixing chamber for blowing the mixed air toward a front foot opening portion, and air from a rear cool air passage and air from a rear warm air passage are mixed in a rear air mixing chamber provided on an extending line of a flow direction of air passing through the heating heat exchanger. The air mixed in the rear air mixing chamber is blown toward a rear opening portion. Thus, air having passed through the heating heat exchanger can approximately linearly flow into the rear air mixing chamber. As a result, the pressure loss in the rear warm air passage can be reduced to increase the amount of air blown toward a rear seat side in a passenger compartment.

Preferably, the first bypass passage and the first air mixing chamber are provided at an upper side of the heating heat exchanger, and the second bypass passage is provided at a lower side of the heating heat exchanger. Therefore, the first bypass passage and the first air mixing chamber can be linearly communicated with the face opening portion at an upper side of the heating heat exchanger, and the second bypass passage can be made proximate to the second air mixing chamber. Thus, the pressure loss in a ventilation system becomes smaller, while decreasing a size of the air conditioning apparatus.

BRIEF DESCRIPTION OF THE DRAWINGS

Additional objects and advantages of the present invention will be more readily apparent from the following detailed description of preferred embodiments when taken together with the accompanying drawings, in which:

FIG. 2A is a perspective view taken from an arrow A in FIG. 1,

FIG. 2B is a perspective view taken from an arrow C in FIG. 1;

FIG. 3 is a schematic diagram showing an air conditioning unit of the air conditioning apparatus in a face mode according to the first embodiment;

DETAILED DESCRIPTION OF THE PRESENTLY PREFERRED EMBODIMENTS

Preferred embodiments of the present invention are described hereinafter with reference to the accompanying drawings.

A first preferred embodiment of the present invention will be now described.

Figure 1:
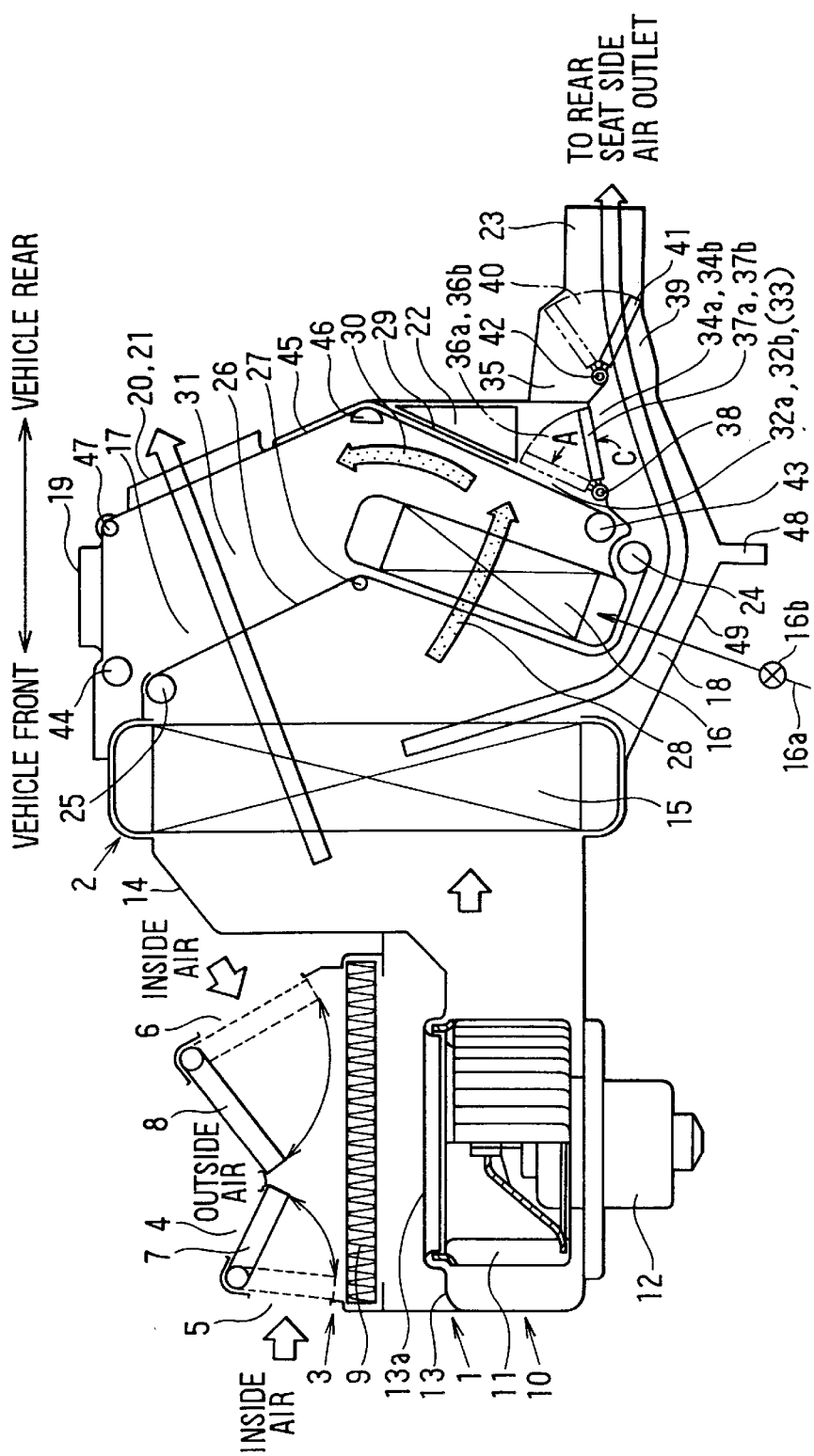
FIG. 1 is a schematic diagram showing an entire construction of a ventilation system of an air conditioning apparatus according to a first preferred embodiment of the present invention.

As shown in FIG. 1, an air conditioning apparatus includes a blower unit 1 and an air conditioning unit 2. In FIG. 1, to readily describe the arrangement of the air conditioning unit 2 and the blower unit 1, the blower unit 1 is placed at a vehicle front side of the air conditioning unit 2. However, actually, the blower unit 1 is disposed at an offset position of the air conditioning unit 2 in a left-right direction of the vehicle. That is, the blower unit 1 is shifted from the air conditioning unit 2 in the left-right direction of the vehicle.

In the first embodiment, the air conditioning unit 2 is disposed at an approximate center portion in the left-right direction of the vehicle, under an instrument panel at a front side in the passenger compartment. The blower unit 1 is disposed at an offset position of the air conditioning unit 2 in the left-right direction of the vehicle. When the blower unit 1 is disposed in an engine compartment at an offset position relative to the air conditioning unit 2 in the left-right direction of the vehicle, the blower unit 1 can be disposed at the front side of the air conditioning unit 2 as shown in FIG. 1.

As shown in FIG. 1, the blower unit 1 has an inside/outside air switching box 3 at an upper side thereof. The inside/outside air switching box 3 includes an outside air introduction port 4 for introducing outside air (i.e., air outside the passenger compartment), inside air introduction Ad ports 5, 6 for introducing inside air (i.e., air inside the passenger compartment), and inside/outside air switching doors 7, 8 which are operatively connected to each other. The inside/outside air switching doors 7, 8 open and close the outside air introduction port 4 and the inside air introduction ports 5, 6. At a downstream air side of the inside/outside air switching doors 7, 8, a filter 9 for removing and cleaning dust and malodorous substance contained in air introduced from the introduction ports 4–6 is disposed.

A blower 10 is disposed at a lower side of the blower unit 1. The blower 10 includes a fan 11 composed of a centrifugal multi-blades fan (sirocco fan), a motor 12 for rotating and driving the fan 11, and a scroll case 13 for accommodating the fan 11. A suction port 13a for sucking air having passed through the filter 9 is opened at an upper portion of the scroll case 13 of the blower unit 1. An air outlet portion of the scroll case 13 is communicated with the most upstream air side (i.e., most front portion in FIG. 1) of the air conditioning unit 2 so that air is blown from the blower unit 1 toward the air conditioning unit 2.

Next, the air conditioning unit 2 will be now described. The air conditioning unit 2 includes an air conditioning case 14 made of resin, and is composed of a plurality of division cases. The division cases are integrally connected by fastening means such as a spring clip and a screw to form the air conditioning case 14. The air outlet of the scroll case 13 is connected to the most front portion of the air conditioning unit 14. Thus, air flows into the air conditioning case 14 by operating the fan 11 of the blower unit 1.

Within the air conditioning case 14, an evaporator 15 and a heater core 16 are disposed in series. The evaporator 15 is disposed at an upstream air side of the heater core 16, and constructs a refrigerant cycle with a compressor, a condenser and a decompresion unit. The evaporator 15 is a cooling heat exchanger for cooling air in the air conditioning case 14. The heater core 16 is a heating heat exchanger for heating air in the air conditioning case 14 using engine cooling water (i.e., hot water) flowing therein as a heating source. The heater core 16 includes a heat-exchanging core portion having a plurality of flat tubes through which hot water flows, and corrugate fins each of which is connected to adjacent flat tubes.

A hot water valve 16b is disposed in a hot water circuit 16a for supplying the engine cooling water (hot water) into the heater core 16. In the maximum cooling mode for a front seat side in the passenger compartment, the hot water valve 16b interrupts the flow of the engine cooling water toward the heater core 16.

The evaporator 15 is disposed to cross whole areas of an air passage in the air conditioning case 14 so that air passes through the evaporator 15 from a front side toward a rear side of the vehicle. As shown in FIG. 1, the evaporator 15 is thin in the front-rear direction of the vehicle, and the heater core 16 is also thin in the front-rear direction of the vehicle. The heater core 16 is disposed to cross only a part of a lower side air passage in the air conditioning case 14 to form a first cool air bypass passage 17 and a second cool air bypass passage 18 at upper and lower sides of the heater core 16.

At a downstream air side of the air conditioning case 14, there is formed a plurality of air outlet opening portions 19–23, and air outlet ducts for blowing conditioned air toward predetermined positions in the passenger compartment are connected to the air outlet opening portions 19–23 at downstream air sides thereof, respectively. The air outlet opening portions 19–23 include a defroster opening portion 19, a center face opening portion 20, a side face opening portion 21, a foot opening portion 22 and a rear seat side opening portion 23.

The defroster opening portion 19 is provided at an upper side of the air conditioning case 14, and is communicated with a defroster air outlet for blowing conditioned air toward an inner surface of a front windshield of the vehicle through a defroster duct. The center face opening portion 20 and the side face opening portion 21 are provided at an upper side of a rear surface portion of the air conditioning case 14. That is, the center face opening portion 20 is provided at a center portion in a left-right direction of the vehicle, and the side face opening portion 21 is provided at left and right both sides of the center face opening portion 20. The center face opening portion 20 is communicated with a center face air outlet for blowing conditioned air toward the upper portion of a passenger seated on a front seat in the passenger compartment through a face duct. The side face opening portion 21 is communicated with side face air outlets for blowing conditioned air toward left and right both sides of side windshields or toward the head portion of a passenger seated on a front seat in the passenger compartment, through a side face duct.

Further, the foot opening portion 22 is provided in the rear side surface of the air conditioning case 14 at left and right lower two sides, and is communicated with both of a left seat side foot air outlet (i.e., driver's seat side air outlet) for blowing conditioned air toward the foot portion of a driver in the passenger compartment and a right side foot air outlet (i.e., a front passenger's side air outlet) for blowing conditioned air toward the foot portion of a passenger seated on a front passenger's seat next to the driver's seat, through foot ducts. The rear seat side opening portion 23 (hereinafter referred to as "rear opening portion 23") is communicated with both of a rear seat side foot air outlet (hereinafter referred to as "rear foot air outlet") for blowing conditioned air toward the foot portion of a passenger seated on a rear seat in the passenger compartment and a rear seat side face air outlet (hereinafter referred to as "rear face air outlet") for blowing conditioned air toward the upper portion of the passenger seated on the rear seat in the passenger compartment, through rear seat side ducts.

On the other hand, a first driving shaft 24 and a first driven shaft 25 are rotatably held in the air conditioning case 14. Two end of a film-like air mixing film member (i.e., first air mixing unit) 26 are wound around the first driving shaft 24 and the first driven shaft 25 to fix the air mixing film member 26 to the shafts 24, 25. The air mixing film member 26 (i.e., film door) is made of a resin which has a flexibility to some degree and is superior in a strength, such as polyethylene.

The air mixing film member 26 is disposed slidably in an up-down direction of the vehicle by the first driving shaft 14, an intermediate shaft 27, a side surface of the heater core 16 and the first driven shaft 25 to cross a warm air passage 28 through which cool air flows into the heater core 16 and the first cool air bypass passage 17 through which cool air bypasses the heater core 16. Further, the air mixing film member 26 is disposed to have a predetermined tension between the shafts 25–27.

The first driving shaft 24 is driven by a driving unit such as a step motor, and the rotation of the first driving shaft 24 is transmitted to the first driven shaft 25 through a rotation transmission mechanism. The air mixing film member 26 has a plurality of opening portions, and the opening portions of air mixing film member 26 are stopped at predetermined positions by rotating the first driving shaft 24 in forward and backward directions, so that an amount of air flowing through the first cool air bypass passage 17 and an amount of air flowing through the warm air passage 28 are controlled.

A wall surface 29 standing from a lower side of the air conditioning case 14 toward an oblique upper side thereof is formed in the air conditioning case 14 to form a warm air passage 30 through which warm air having passed through the heater core 16 flows upward. At an upper position of the heater core 16 in the air conditioning case 14, there is formed a first air mixing chamber 31 for mixing cool air from the first cool air bypass passage 17 and warm air from the warm air passage 30. Conditioned air having a predetermined temperature can be obtained by mixing cool air and warm air in the first air mixing chamber 31, and is blown toward the defroster opening portion 19 or the face opening portions 20, 21 for the front seat side in the passenger compartment.

At a downstream air side of the heater core 16 (i.e., at an immediately rear side of the core portion of the heater core 16) in the wall surface 29, foot warm air opening portions 32*a*, 32*b* and a rear warm air opening portion 33 are opened. As shown in FIG. 2A, the foot warm air opening portions 32*a*, 32*b* and the rear warm air opening portion 33 are provided in series in the left-right direction of the vehicle. That is, the rear warm air opening portion 33 is at an approximate center position of the air conditioning case 14 in the left-right direction of the vehicle, and the foot warm air opening portions 32*a*, 32*b* are provided at two side of the rear warm air opening portion 33 in the left-right direction of the vehicle. Thus, as shown in FIG. 2A, the warm air opening portions 32*a*, 32*b*, 33 are symmetric relative to a center line B in the left-right direction of the vehicle. In FIG. 2A, chain lines 160 show the ends of the core portion of the heater core 16 in the left-right direction of the vehicle.

At the same positions as the foot warm air opening portions 32*a*, 32*b* in the left-right direction of the vehicle, foot cool air opening portions 34*a*, 34*b* are provided as shown in FIG. 2B. The foot cool air opening portions 34*a*, 34*b* are communicated with the second cool air bypass passage 18, and cool air from the second cool air bypass passage 18 is introduced into second air mixing chambers 36*a*, 36*b* described later through the foot cool air opening portions 34*a*, 34*b*.

Warm air from the rear warm air opening portion 33 flows in a rear warm air passage 35 provided at a center upper position between the foot cool air opening portions 34*a*, 34*b*. That is, as shown in FIG. 2B, the foot cool air opening portions 34*a*, 34*b* are partitioned by the rear warm air passage 35. At a left side of the rear warm air passage 35, there is provided a left-side second air mixing chamber 36*a* in which warm air from the foot warm air opening portion 32*a* and cool air from the foot cool air opening portion 34*a* are mixed from each other. At a right side of the rear warm air passage 35, there is provided a right-side second air mixing chamber 36*b* in which warm air from the foot warm air opening portion 32*b* and cool air from the foot cool air opening portion 34*b* are mixed.

Between the foot warm air opening portions 32*a*, 32*b* and the foot cool air opening portions 34*a*, 34*b*, foot air mixing doors 37*a*, 37*b* (i.e., second air mixing unit) are disposed respectively. The foot air mixing doors 37*a*, 37*b* are plate-like doors, and are integrally rotated around a rotary shaft 38. By rotating the foot air mixing doors 37*a*, 37*b* at predetermined positions, the amounts of cool air and warm air flowing into the second air mixing chamber 36*a*, 36*b* can be adjusted.

Conditioned air having a predetermined temperature is obtained by mixing cool air and warm air in the left and right second air mixing chambers 36*a*, 36*b*, and flows into left and right two foot opening portions 22 provided at left and right two sides of the air conditioning case 14.

The foot air mixing doors 37*a*, 37*b* and the air mixing file member 26 are for controlling the temperature of air to be blown into the passenger compartment. In the bi-level mode, the foot air mixing doors 37*a*, 37*b* and the air mixing film member 26 are respectively independently controlled, to independently control the temperature of air blown from the center face opening portion 20 and the side face opening portion 21 and the temperature of air blown from the foot opening portion 22. Therefore, a rotary shaft 38 of the foot air mixing doors 37*a*, 37*b* is connected to and driven by an independent driving unit (e.g., step motor) through a link mechanism.

A rear cool air passage 39 is provided at the most downstream air side (i.e., rear side of the vehicle) in the second cool air bypass passage 18. A third air mixing chamber 40 (i.e., rear air mixing chamber) is provided at a downstream air side of the rear cool air passage 39 and the rear warm air passage 35. The third air mixing chamber 40 is provided on an extending line of a flow direction of warm air passing through the heater core 16.

A rear air mixing door 41 for adjusting a ratio between the amount of cool air flowing into the third air mixing chamber 40 from the rear cool air passage 39 and the amount of warm air flowing into the third air mixing chamber 40 from the rear warm air passage 35 are disposed at the downstream air side of the two air passages 35, 39. The rear air mixing door 41 is rotated and driven by a driving unit (e.g., step motor) different from the driving unit of the foot air mixing doors 37*a*, 37*b* and the air mixing film member 26. Conditioned air having a predetermined temperature can be obtained by mixing cool air and warm air in the third air mixing chamber 40, and flows toward the rear seat side opening portion 23.

A second driving shaft 43 and a second driven shaft 44 are rotatably held in the air conditioning case 14. Two ends of an air outlet mode film member 45 are fixed to and wound around the second driving shaft 43 and the second driven shaft 44. Similarly to the air mixing film member 26, the air outlet mode film member 45 made of a resin film having a flexibility.

An intermediate guide shafts 46, 47 are disposed between the second driving shaft 43 and the second driven shaft 44. The air outlet mode film member 45 is bent to slide along the inner surface of the air conditioning case 14 using the intermediate guide shafts 46, 47, and the intermediate guide shafts 46, 47 guides the movement of the air outlet mode film member 45. The intermediate guide shafts 46, 47 and the intermediate guide shaft 27 may be disposed rotatably to smoothly move the film members 45, 26. However, the intermediate guide shafts 46, 47, 27 may be formed integrally with the air conditioning case 14 to be fixed to the air conditioning case 14. That is, the intermediate guide shafts 46, 47, 27 maybe not rotated.

The air outlet mode film member 45 is disposed by the second driving shaft 43, the intermediate guide shafts 46, 47 and the second driven shaft 44 to have a predetermined tension and to be opposite to each opening portion 19, 20, 21, the foot warm air opening portions 32*a*, 32*b*, and the rear warm air opening portion 33, so that the air outlet mode film member 45 is moved along the inner surface of the air conditioning case 14.

The second driving shaft 43 is independently driven by a driving unit such as a step motor, and the rotation of the second driving shaft 43 is transmitted to the second driven shaft 44 through a transmission mechanism. The air outlet mode film member 45 has a plurality of opening portions through which air flows. The second driving shaft 43 movers forward and backward directions by the driving unit so that the plurality of opening portions are stopped at predetermined positions to select an air outlet mode. That is, by switching the communication between the opening portions of the air outlet film member 45 and the opening portions 19–21, 32a, 32b, 33 of the air conditioning case 14, an air outlet mode is selected.

In the first embodiment, because the second cool air bypass passage 18 is formed at the lower side of the heater core 16, the second cool air bypass passage 18 is used as a water draining passage for draining condensed water generated in the evaporator 15. A draining pipe 48 is formed at the most low position of the bottom of the air conditioning case 14, and an inclined surface 49 inclined gradually from the bottom of the evaporator 15 toward the draining pipe 48 is formed to drain the condensed water along the inclined surface 49. That is, in the first embodiment, the condensed water generated in the evaporator 15 is discharged to the outside through the inclined surface 49 and the draining pipe 48, while using the space over the inclined surface 49 and the draining pipe 48 as the second cool air bypass passage 18.

Next, the operation of the air conditioning apparatus according to the first embodiment will be now described.

(1) FACE MODE

In the face mode, as shown in FIG. 3, the center face opening portion 20 and the side face opening portion 21 are opened by the opening portion of the air outlet mode film member 45, and the defroster opening portion 19 and the foot warm air opening portions 32a, 32b are closed by the film portion of the air outlet mode film member 45. Further, the foot air mixing doors 37a, 37b fully close the foot cool air opening portions 34a, 34b to close the foot opening portion 22. In this state, when the fan 11 of the blower unit 1 is operated, air sucked in the air conditioning case 14 through the inside/outside air switching box 3 is cooled and dehumidified by the evaporator 15 to be cool air, and the cool air flows into both of the first cool air bypass passage 17 and the warm air passage 28 according to the stopped position of the air mixing film member 26.

In the maximum cooling mode, the air mixing film member 26 fully opens the first cool air bypass passage 17 and fully closes the warm air passage 28. Therefore, the whole amount of cool air flows into the center face opening portion 20 and the side face opening portion 21 through the first cool air bypass passage 17 and the first air mixing chamber 31, and is blown toward the head portion of a passenger seated on a front seat in the passenger compartment from the center face air outlet and the side face air outlet. Further, in the maximum cooling mode, the hot water valve 16b is fully closed to interrupt the flow of hot water to the heater core 16.

As shown in FIG. 3, cool air approximately linearly flows into the center face opening portion 20 and the side face opening portion 21 from a downstream air side of the evaporator 15 through the first cool air bypass passage 17 and the first air mixing chamber 31 to have a short distance between the evaporator 15 and the face opening portions 20, 21. Therefore, the pressure loss in the air conditioning case 14 becomes small in the face mode. Further, because the face opening portions 20, 21 are provided to be separated from the foot opening portion 22, the opening area of the face opening portions 20, 21 can be made larger without being affected by the foot opening portion 22. Thus, in the face mode, the pressure loss (i.e., air flow resistance) in the ventilation system can be decreased to increase the amount of cool air blown toward the passenger compartment, and the cooling capacity for the passenger compartment can be improved.

In a temperature control area (i.e., air mixing mode) during the face mode, the air mixing film member 26 opens a part of the warm air passage 28 while opening the first cool air bypass passage 17. Therefore, as shown in FIG. 3, warm air having passed through the warm air passage 28 rises and passes through the warm air passage 30, and flows into the first air mixing chamber 31. Conditioned air having a predetermined low temperature is obtained by mixing warm air from the warm air passage 30 and cool air from the first cool air bypass passage 17 in the first air mixing chamber 31, and is blown toward the upper portion of the passenger in the passenger compartment and the inner surfaces of the side windshields through the center face opening portion 20 and the side face opening portion 21.

(2) BI-LEVEL MODE

Figure 4:
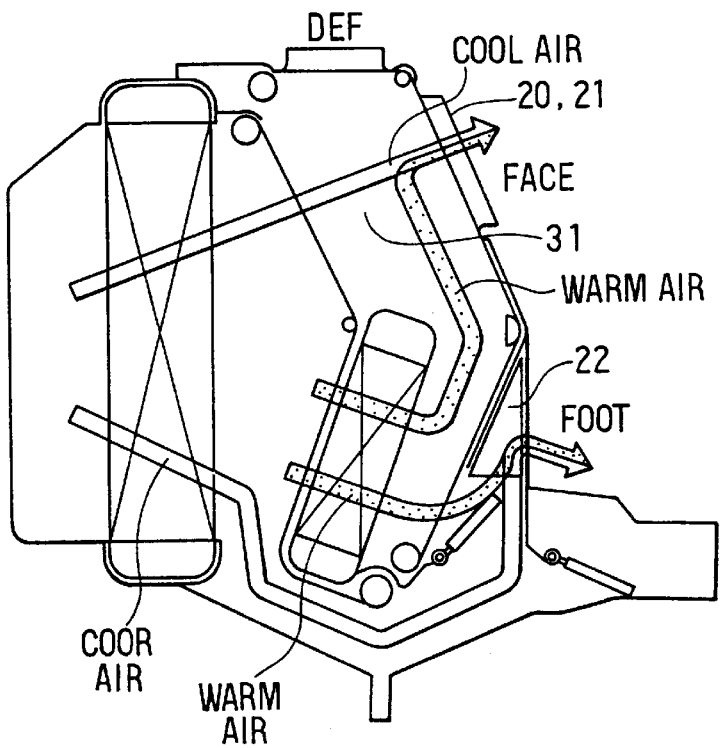
FIG. 4 is a schematic diagram showing the air conditioning unit in a bi-level mode according to the first embodiment.

In the bi-level mode, as shown in FIG. 4, the face opening portions 20, 21 as well as the foot warm air opening portions 32a, 32b are opened by the opening portions of the air outlet mode film member 45, and the defroster opening portion 19 is closed by the film portion of the air outlet mode film member 45. Therefore, conditioned air is blown toward the upper portion of a passenger seated on the front seat in the passenger compartment and the side windshields from the center face opening portion 20 and the side face opening portion 21, and is blown toward the foot portion of the passenger seated on the front seat in the passenger compartment from the foot opening portion 22.

In the first air mixing chamber 31, warm air and cool air are mixed to obtain conditioned air having a predetermined temperature, and the conditioned air is blown from the center face opening portion 20 and the side face opening portion 31. On the other hand, the ratio between the amount of cool air flowing into the second air mixing chambers 36a, 36b from the foot cool air opening portions 34a, 34b and warm air flowing into the second air mixing chambers 36a, 36b from the foot warm air opening portions 32a, 32b is adjusted by the foot air mixing doors 37a, 37b. Therefore, cool air and warm air are mixed in the second air mixing chambers 36 to obtain conditioned air having a predetermined temperature, and the conditioned air is blown toward the foot portion of the passenger seated on the front seat in the passenger compartment from the foot opening portion 22.

In the first embodiment, the position of the opening portions of the air mixing film member 26 and the opening degrees of the foot air mixing doors 37a, 37b are respectively independently controlled so that a temperature difference between upper and lower sides in the passenger compartment can be arbitrarily set.

(3) FOOT MODE

Figure 5:
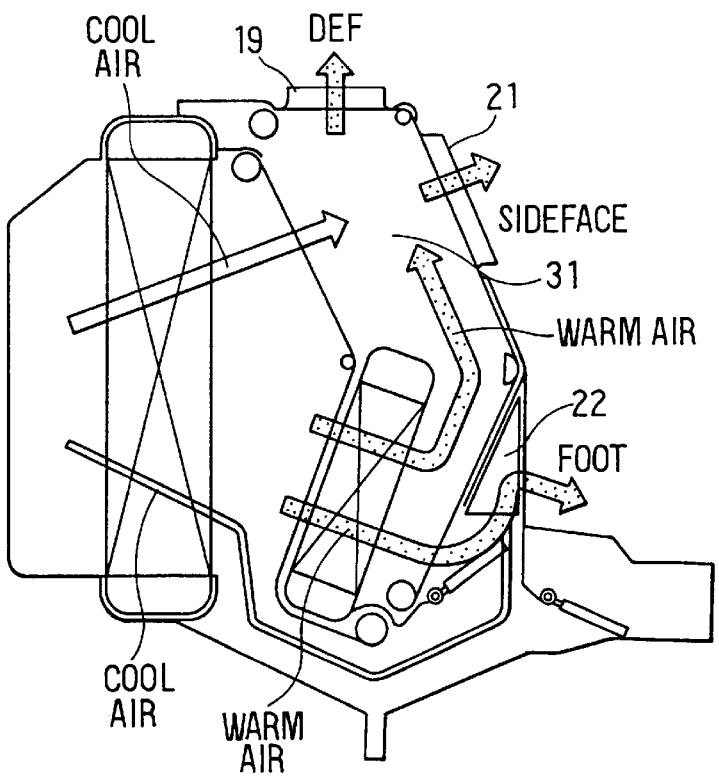
FIG. 5 is a schematic diagram showing the air conditioning unit in a foot mode according to the first embodiment.

In the foot mode, as shown in FIG. 5, each of the defroster opening portion 19 and the side face opening portion 21 is opened in a small opening degree and the foot warm air opening portions 32a, 32b are opened in large opening degrees by the opening portions of the air outlet mode film member 45. Further, the center face opening portion 20 is fully closed by the film portion of the air outlet mode film member 45. In the foot mode, warm air and cool air are mixed in the first air mixing chamber 31 to obtain conditioned air having a predetermined temperature, and the conditioned air is blown from the defroster opening portion 19 and the side face opening portion 21. Further, by the opening degrees of the foot air mixing doors 37a, 37b, cool air and warm air are mixed in the second air mixing chambers 36a, 36b to have a predetermined temperature, and the conditioned air is blown toward the foot area of the passenger seated on the front seat in the passenger compartment from the foot opening portion 22.

When the maximum heating mode is set during the foot mode, the air mixing film member 26 fully closes the first cool air bypass passage 17 and fully opens the warm air passage 28. Simultaneously, because the foot air mixing doors 37a, 37b fully close the foot cool air opening portions 34a, 34b, only warm air from the warm air passage 28 flows into the foot opening portion 22 through the foot opening portions 32a, 32b and second air mixing chambers 36a, 36b. At this time, warm air approximately linearly flows from a downstream air side of the heater core 16 toward the foot opening portion 22 through the foot warm air opening portions 32a, 32b and the second air mixing chambers 36a, 36b. Therefore, the pressure loss (i.e., air flow resistance) in the air conditioning case becomes small. Further, the opening area of the foot opening portion 22 can be made larger without being affected by the face opening portions 20, 21. Thus, in the foot mode, the pressure loss in the air conditioning case 14 is decreased to increase the amount of warm air blown into the passenger compartment, and the heating capacity for the passenger compartment can be improved.

In the foot mode, the amount of air blown from the defroster opening portion 19 and the side face opening portion 21 is approximately set at 20%, and the amount of air blown from the foot opening portion 22 is approximately set at 80%.

In the first embodiment, a foot/defroster mode can be set. In the foot/defroster mode, the amount of air blown from the defroster opening portion 19 and the side face opening portion 21 is approximately set at 50%, and the amount of air blown from the foot opening portion 22 is approximately set at 50%. The other operations in the foot/defroster mode are similar to that in the foot mode.

(4) DEFROSTER MODE

Figure 6:
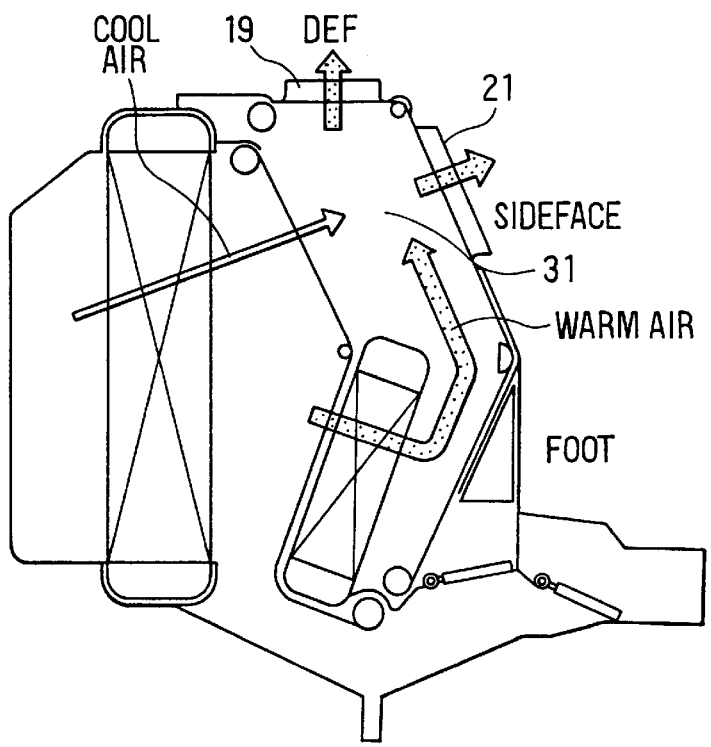
FIG. 6 is a schematic diagram showing the air conditioning unit in a defroster mode according to the first embodiment.

In the defroster mode, as shown in FIG. 6, the defroster opening portion 19 and the side face opening portion 21 are opened by the opening portions of the air outlet mode film member 45, and the foot warm air opening portions 32a and 32b and the center face opening portion 20 are closed by the film portion of the air outlet mode film member 45. Further, the foot air mixing doors 37a, 37b fully close the foot cool air opening portions 34a, 34b. Thus, the foot opening portion 22 is closed. Warm air and cool air are mixed in the first air mixing chamber 31 to obtain conditioned air having a predetermined temperature, and the conditioned air is blown only from the defroster opening portion 19 and the side face opening portion 21.

Next, a rear seat side air outlet mode for blowing conditioned air toward the rear seat side opening portion 23 will be now described with reference to FIGS. 7–9. In the above-described any one of the front seat side air outlet mode shown in FIGS. 3–6, the rear warm air opening portion 33 is always opened by the opening portion of the air outlet mode film member 45. Therefore, the rear warm air passage 35 always communicates with an immediately downstream air side of the heater core 16 through the rear warm air opening portion 33. On the other hand, the rear cool air passage 39 is directly communicated with the second cool air bypass passage 18. Thus, the amount of warm air from the rear warm air passage 35 and the amount of cool air from the rear cool air passage 39 are adjusted by the opening degree of the rear air mixing door 41 so that conditioned air having a predetermined temperature can be obtained in the third air mixing chamber 40 (i.e., rear seat side air mixing chamber).

Figure 7:
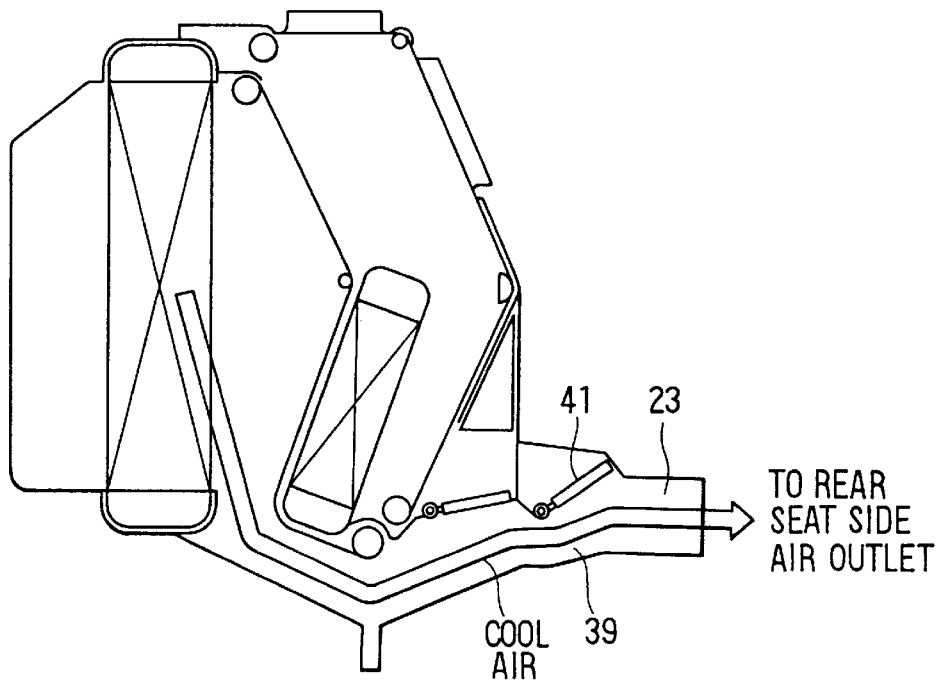
FIG. 7 is a schematic diagram showing the air conditioning unit in the maximum cooling mode for a rear seat side in a passenger compartment according to the first embodiment.

As shown in FIG. 7, in the maximum cooling mode, the rear air mixing door 41 fully closes the rear warm air passage 35 and fully opens the rear cool air passage 39. Therefore, only cool air from the rear cool air passage 39 flows into the rear opening portion 23, and the maximum cooling capacity for the passenger compartment can be improved.

Figure 8:
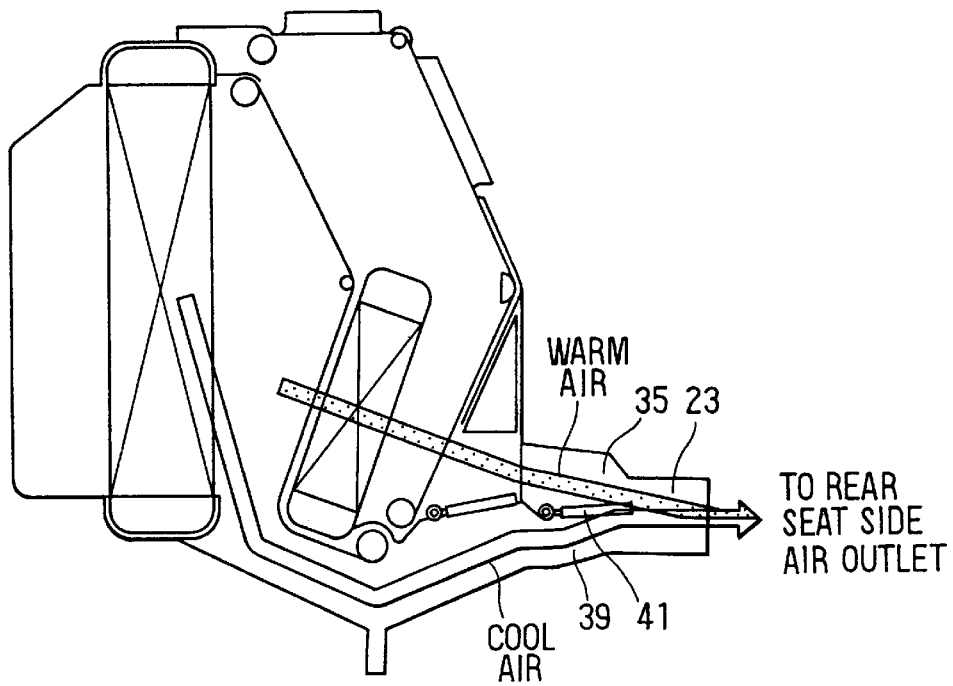
FIG. 8 is a schematic diagram showing the air conditioning unit in an air mixing mode for the rear seat side in the passenger compartment according to the first embodiment.

As shown in FIG. 8, in an air mixing mode where warm air and cool air are mixed in the third air mixing chamber 40, that is, in the temperature control state, the rear air mixing door 41 is operated at an intermediate position where both the rear warm air passage 35 and the rear cool air passage 39 are opened to control the temperature of air blown toward the rear seat side in the passenger compartment.

Figure 9:
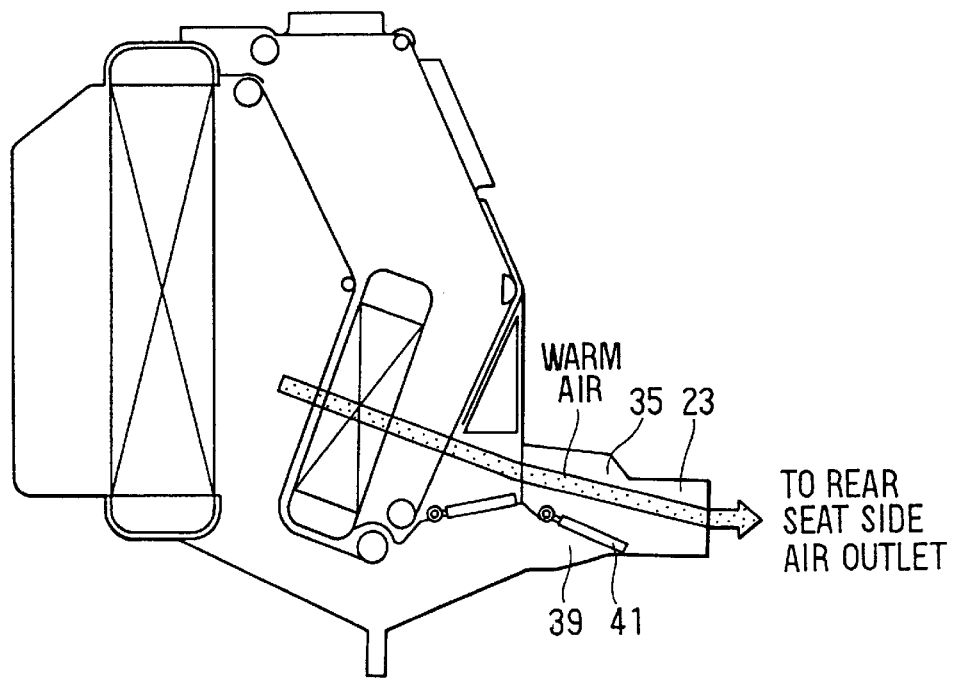
FIG. 9 is a schematic diagram showing the air conditioning unit in the maximum heating mode for the rear seat side in the passenger compartment according to the first embodiment.

As shown in FIG. 9, in the maximum heating mode, the rear air mixing door 41 fully opens the rear warm air passage 35 and fully closes the rear cool air passage 39. Therefore, warm air only from the rear warm air passage 35 flows into the rear opening portion 23 to improve the heating capacity for the passenger compartment.

In the first embodiment, because the rear air mixing door 41 for controlling the temperature of air flowing into the rear opening portion 23 is independently operated, the temperature of air to be blown toward the front seat side and the temperature of air to be blown toward the rear seat side in the passenger compartment can be respectively independently controlled.

A second preferred embodiment of the present invention will be now described.

Figure 10:
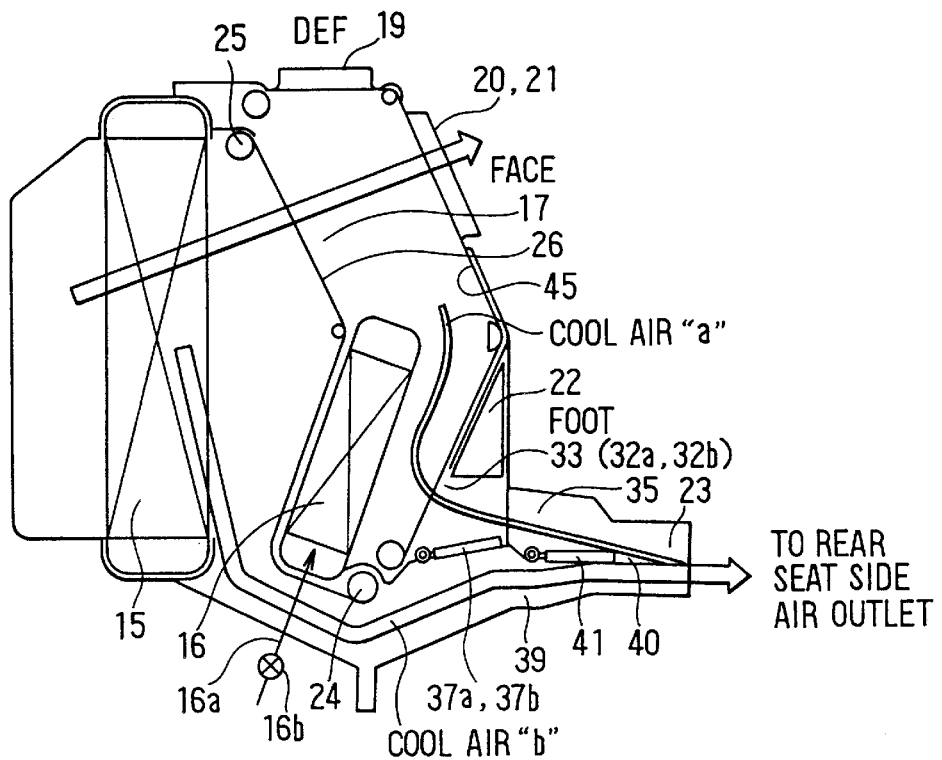
FIG. 10 is a schematic diagram showing the air conditioning unit in the air mixing mode for the rear seat side in the passenger compartment, when the maximum cooling mode is set at a front seat side in the passenger compartment according to the first embodiment.
Figure 11:
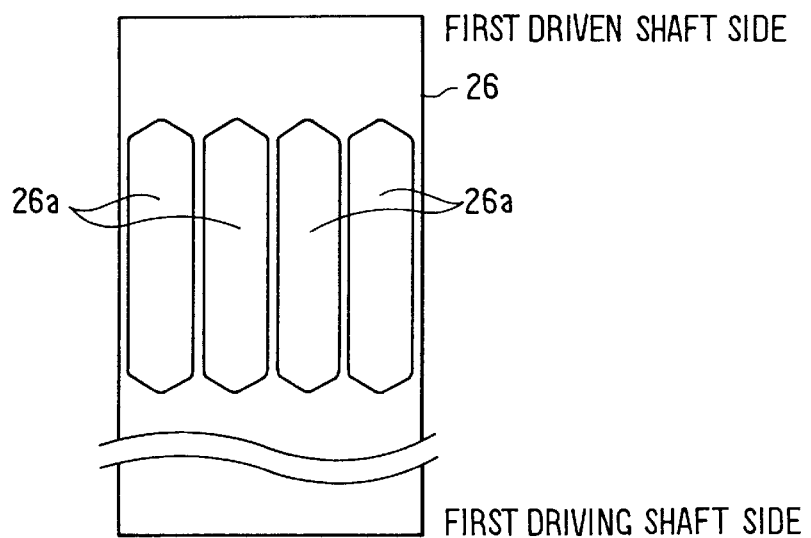
FIG. 11 is a partial plan view of an air mixing film member for the front seat side in the passenger compartment according to the first embodiment.

In the second embodiment, when the maximum cooling mode is set at the front seat side during the face mode, the temperature of cool air blown toward the rear seat side in the passenger compartment can be controlled while maintaining the maximum cooling capacity for the front seat in the passenger compartment. According to the above-described first embodiment, when the maximum cooling mode is set at the front seat side in the passenger compartment during the face mode, the air mixing film member 26 fully opens the first cool air bypass passage 17 and fully closes the warm air passage 28; and therefore, air does not passes through the heater core 16. Thus, in the first embodiment, as shown in FIG. 10, when the maximum cooling mode is set at the front seat side during the face mode, only cool air "a" and cool air "b" are blown toward the rear seat side in the passenger compartment even when the rear air mixing door 41 is operated at an intermediate position. As a result, even if a passenger seated on the rear seat in the passenger compartment wants to increase the temperature of cool air, cool air "a" in FIG. 10 flows into the rear warm air opening portion 33 by closing the warm air passage 28; and therefore, the temperature of cool air to be blown into the rear seat side in the passenger compartment is not controlled by adjusting the opening degree of the rear air mixing door 41. That is, in the first embodiment, as shown in FIG. 11, the air mixing film member 26 only has opening portions 26a for adjusting the ratio between the amount of air passing through the first cool air bypass passage 17 and the amount of air passing through the heater core 16.

Figure 12:
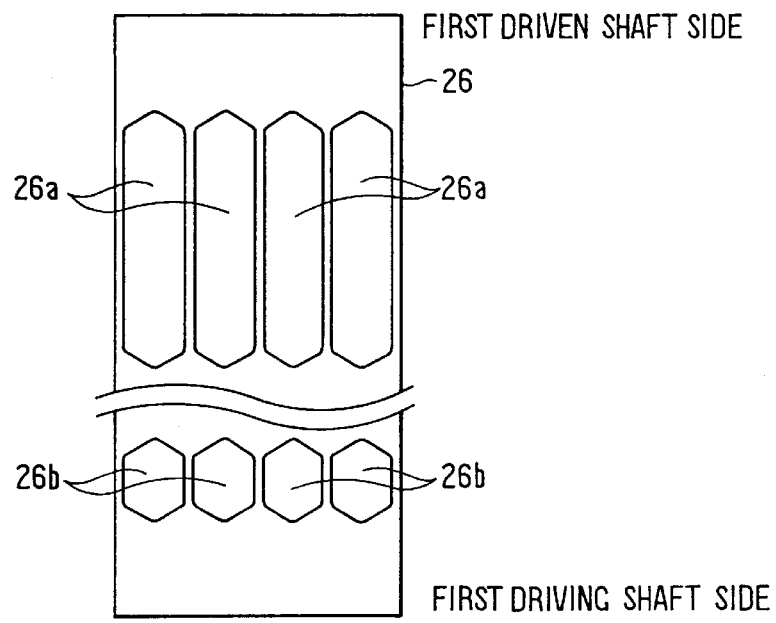
FIG. 12 is a partial plan view of an air mixing film member for the front seat side in the passenger compartment according to a second preferred embodiment of the present invention.

According to the second embodiment, even when the maximum cooling mode is set at the front seat side in the passenger compartment during the face mode, the temperature of air to be blown toward the rear seat side in the passenger compartment can be controlled, because the air mixing film member 26 has supplementary opening portion 26b except of the main opening portions 26a as shown in FIG. 12.

Each supplementary opening portion 26b is provided at a side of the first driving shaft 24 to have a predetermined opening degree which is greatly smaller than that of a main opening portion 26a.

Next, the operation of the air conditioning apparatus according to the second embodiment will be now described. Here, only different operation portions different from those in the first embodiment are described.

When the maximum cooling mode is set at the front seat side in the passenger compartment during the face mode and the maximum cooling mode is also set at the rear seat side in the passenger compartment, the air mixing film member 26 is operated at a predetermined position so that the main opening portions 26a of the air mixing film member 26 fully open the first cool air bypass passage 17 and the supplementary opening portions 26b do not communicate with the core portion of the heater core 16. That is, in this state, because the supplementary opening portions 26a are placed at a lower side of the core portion of the heater core 16 to be proximate to the first driving shaft 24, the warm air passage 28 through which air passes through the heater core 16 is closed by the film portion of the air mixing film member 26. As a result, only cool air is blown from the face opening portions 20, 21 and the rear opening portion 23. Further, at this time, the hot water valve 16b is fully closed so that hot water does not flows into the heater core 16.

Next, when the temperature control area (i.e., air mixing mode) is set from the maximum cooling mode in the rear seat side of the passenger compartment while setting the maximum cooling mode in the front seat side during the face mode, the rear air mixing door 41 is operated at an intermediate position according to the set temperature in the rear seat side in the passenger compartment. In this state, the hot water valve 16b is opened, and hot water circulates in the heater core 16. Simultaneously, the air mixing film member 26 operated at a predetermined position so that the supplementary opening portions 26b of the air mixing film member 26 communicate with the lowest position of the core portion of the heater core 16. Therefore, a part of the warm air passage 28 is opened by the supplementary opening portion 26b of the air mixing film member 26.

Figure 13:
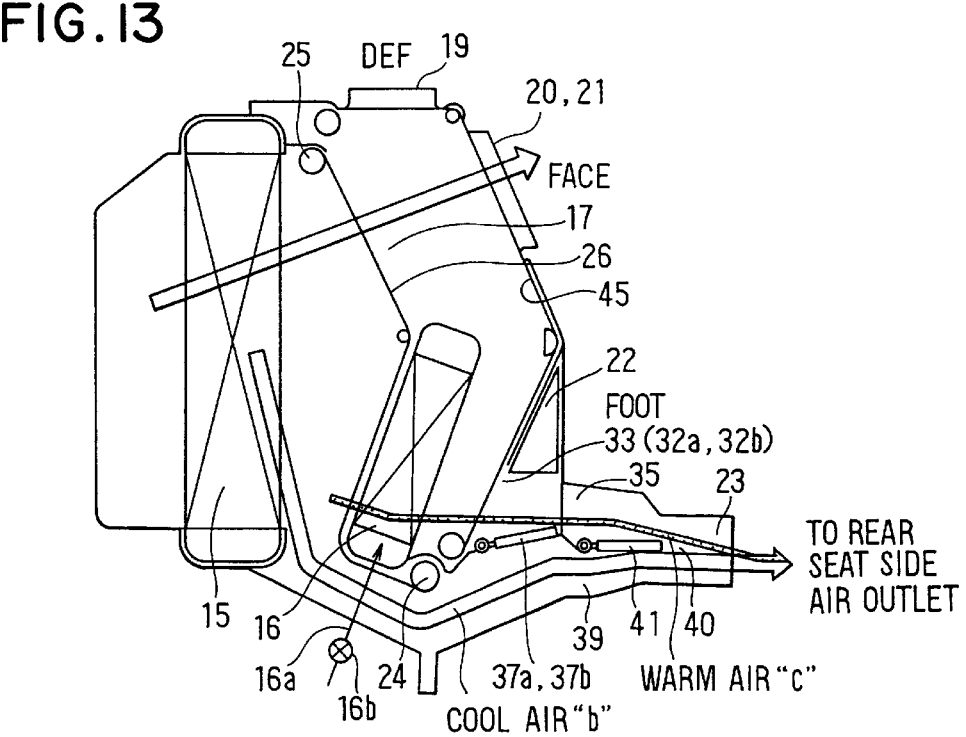
FIG. 13 is a schematic diagram showing an air conditioning unit in the air mixing mode for the rear seat side in the passenger compartment, when the maximum cooling mode is set at a front seat side in the passenger compartment according to the second embodiment.

As a result, as shown in FIG. 13, air from the supplementary opening portion 26b passes through the core portion of the heater core 16 to be warm air "c", and the warm air "c" flows into the third air mixing chamber 40 through the rear warm air opening portion 33 and the rear warm air passage 35 to be mixed with cool air "b". That is, cool air and warm air are mixed in the third air mixing chamber 40 so that conditioned air having a predetermined temperature is blown toward the rear seat side in the passenger compartment. Thus, in the second embodiment, even when the maximum cooling mode is set at the front seat side in the passenger compartment, the temperature of air to be blown toward the rear seat side in the passenger compartment can be controlled by adjusting the opening degree of the air mixing door 41.

Due to the warm air "c", from the supplementary opening portions 26b, the temperature of cool air blown from the face opening portions 20, 21 may be increased. However, as a result of studies and examinations by the inventors, when the opening area of the supplementary opening portions 26b is controlled at a small opening degree less than that of the rear warm air opening portion 33 (i.e., the heat exchanging area of the heater core 16 is controlled at a small area about 9%), it can prevent the warm air "c", from the supplementary opening portions 26b from flowing into the face opening portions 20, 21, and can prevent the temperature of cool air blown from the face opening portions 20, 21 from being increased.

Figure 14:
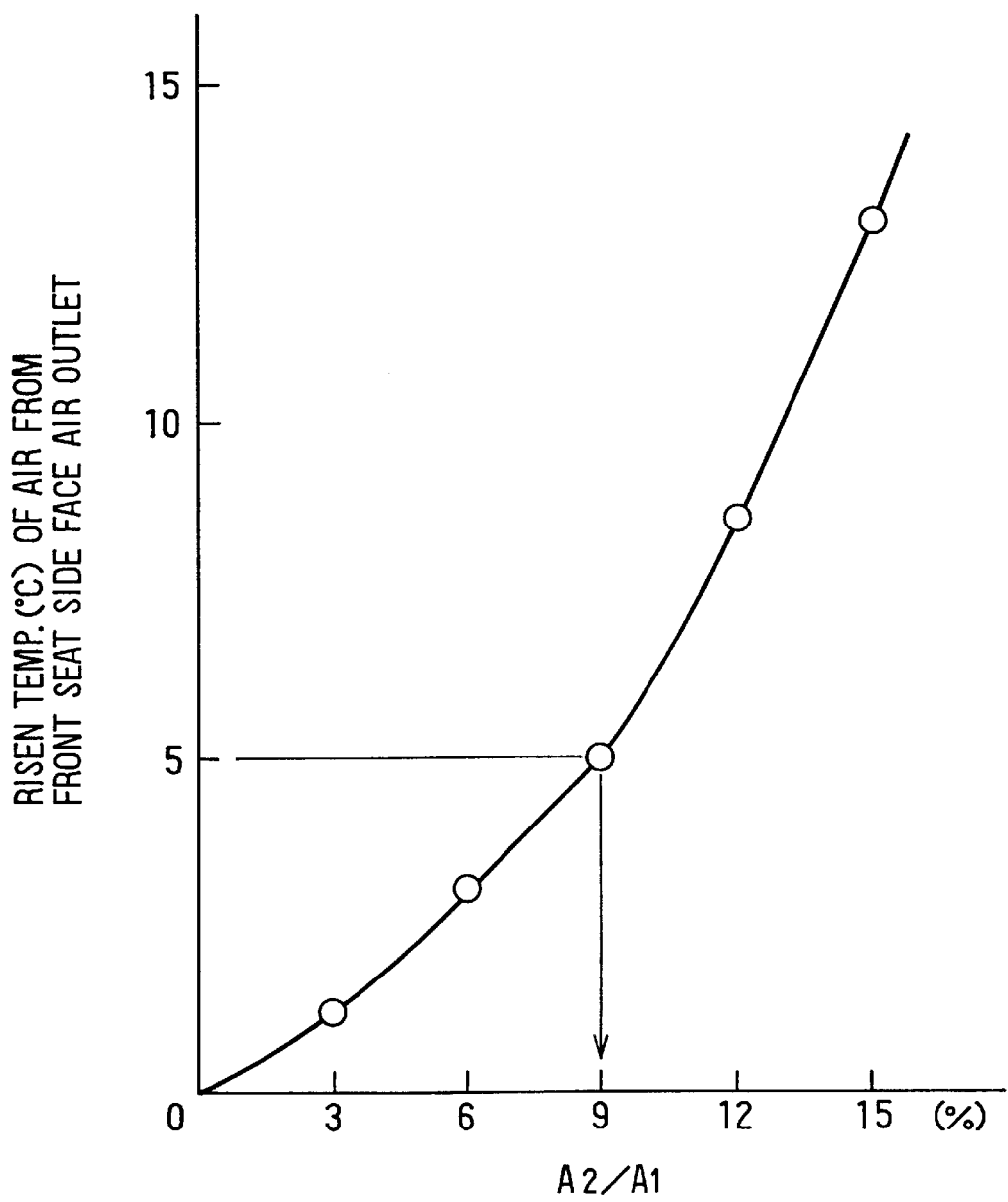
FIG. 14 is a graph showing the relationship between A2/A1 and risen temperature of air blown from a front seat side face air outlet.

FIG. 14 shows the experimental result. In FIG. 14, the abscissa of A2/A1 shows a ratio between an opened area A2 of the supplementary opening portion 26b (i.e., the opened area of the core portion of the heater core 16) and a front surface area A1 of the core portion of the heater core 16, and the ordinate shows the risen temperature of air blown from the face opening portions 20, 21. As shown in FIG. 14, by setting the A2/A1 at a value lower than 9%, the risen temperature of air blown from the front seat side face outlet can be controlled to be lower than 5° C. In the second embodiment, because the opening area of the rear warm air opening portion 33 is approximately 9% relative to the front surface area A1 of the core portion of the heater core 16, warm air "c", from the supplementary opening portion 26, heated in the heater core 16 may flows into the face opening portions 20, 21 through the warm air passage 30 when the opening area of the supplementary opening portion 26b is larger than 9% of the front surface A1 of the heat exchanging area of the heater core 16. Thus, the temperature of air blown from the face opening portions 20, 21 may be increased.

However, in the second embodiment, the opened area A2 of the supplementary opening portion 26b is set to be less than 9% of the front surface area A1 of the core portion of the heater core 16 and to be not larger than the opening area of the rear warm air opening portion 33. Therefore, almost all of the warm air "c" flows into the rear opening portion 33, and it can prevent the temperature of air blown from the face opening portions 20, 21 from being increased.

In the second embodiment, when the temperature control area is set from the maximum cooling mode in the rear seat side when the maximum cooling mode is set at the front seat side during the face mode, the rear air mixing door 41 may be operated at an intermediate position shown in FIG. 13 according to the set temperature. However, in this case, when the rear air mixing door 41 is operated at a position shown in FIG. 15 (i.e., a position proximate to the maximum cooling position), the flow of cool air "b" from the rear cool air passage 39 can be interrupted, and cool air "a" from the first cool air bypass passage 17 can flow into the third air mixing chamber 40 through the rear warm air opening portion 33 and the rear warm air passage 35. By introducing the cool air "a" into the air mixing chamber 40, it can further prevent the warm air "c" from flowing into the face opening portions 20, 21.

To prevent the temperature of cool air from being increased, the opened position of the supplementary opening portions 26b are set at the lower end side of the heater core 16 (i.e., a lower side of the warm air passage 28). However, as a result of studies and examinations, even when the opened position of the supplementary opening portion 26 are set at a center position or an upper portion of the heater core 16 (warm air passage 28) in up-down direction, the temperature of air blown from the face opening portions 20, 21 are increased slightly. That is, in this case, the temperature of cool air blown from the face opening portions 20, 21 is hardly affected.

Further, because the supplementary opening portions 26b of the air mixing film member 26 are communicated with the warm air passage 28 at the lower end side of the heater core 16, the main opening portions 26a of the air mixing film member 26 are shifted at a position where the opening area of first cool air bypass passage 17 becomes slightly smaller. However, actually, the maximum cooling mode at the front seat side is hardly affected in this case.

Figure 15:
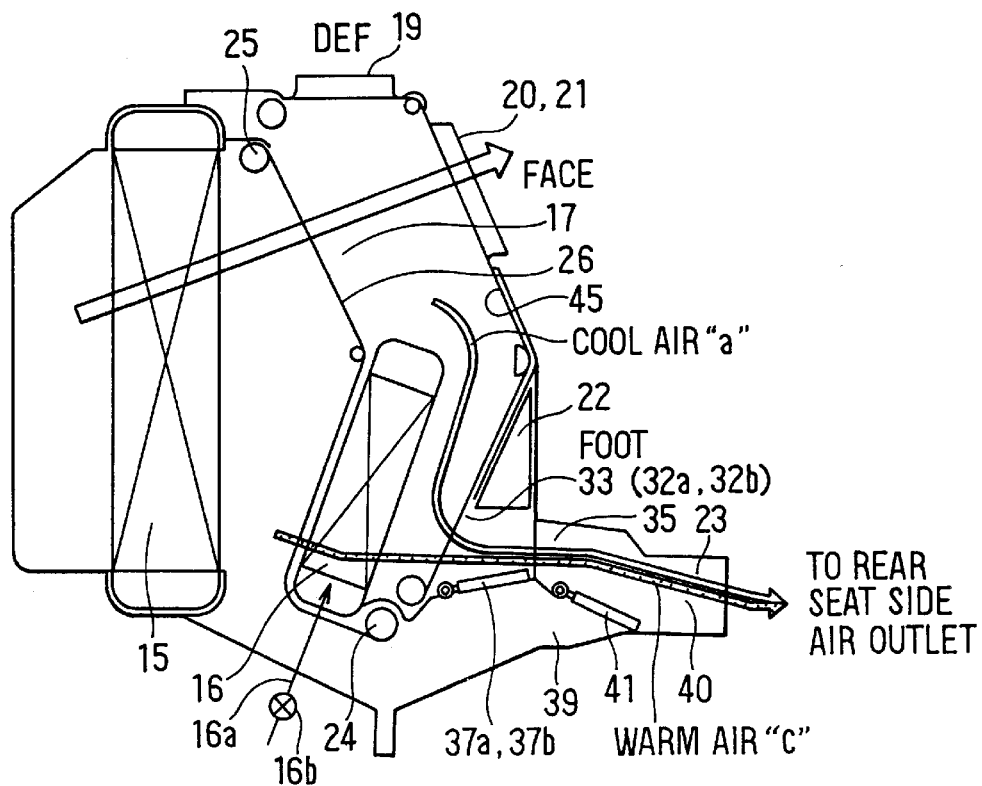
FIG. 15 is a schematic diagram showing a rear seat side air mixing door of the air conditioning unit according to the second embodiment.

As described above, in the second embodiment, after the rear air mixing door 41 is operated at an intermediate position shown in FIG. 13 or at the position shown in FIG. 15, the hot water valve 16b is opened so that hot water circulates in the heater core 16. Therefore, before opening the hot water valve 16, air around the heater core 16 can be communicates with the rear opening portion 23. Thus, when hot water circulates in the hot water valve 16b and the temperature of air around the heater core 16 rises, the temperature of cool air blown toward the rear seat side in the passenger compartment can be immediately readily controlled using the flow of cool air "a" shown in FIG. 10.

Figure 16:
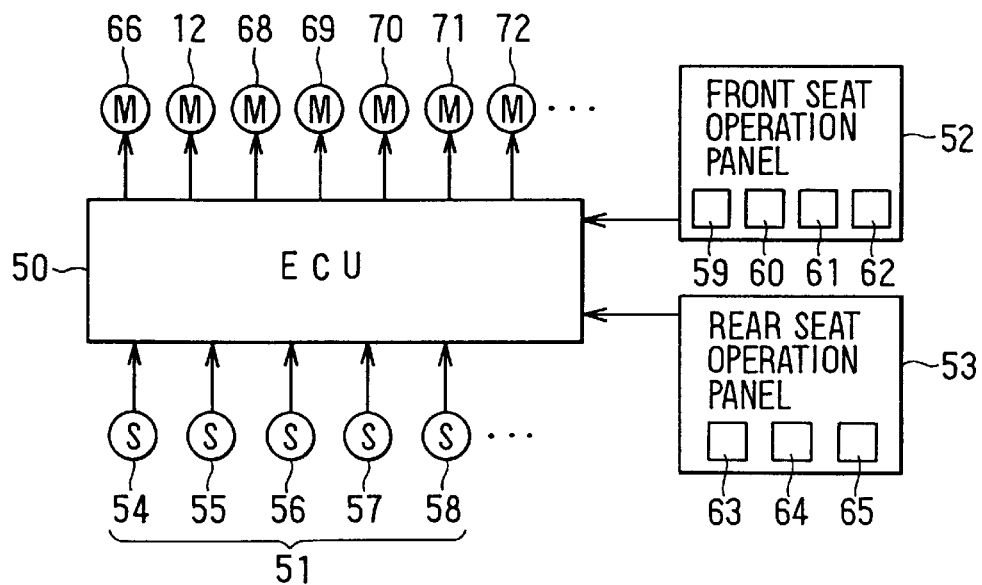
FIG. 16 is a block diagram of an electric control unit according to the first and second embodiment.

The operation of the air conditioning apparatus according to the first and second embodiments is automatically controlled by an electric control unit (i.e., ECU) 50 shown in FIG. 16. The ECU 50 controls the air conditioning apparatus including the blower unit 1 and the air conditioning unit 2 according to a pre-set program. When an ignition switch of the engine of the vehicle is turned ON, electrical power is supplied from a battery to the ECU 50.

As shown in FIG. 16, sensor signals from a sensor group 51, operation signals from a front seat side operation panel 52 provided in the instrument panel at a front side of the passenger compartment and from a rear seat side operation panel 53 provided at a rear seat side in the passenger compartment are respectively input to the ECU 50. The sensor group 51 includes an outside air temperature sensor 54 for detecting a temperature of outside air (i.e., air outside the passenger compartment), an inside air temperature sensor 55 for detecting a temperature of inside air (i.e., air inside the passenger compartment), a sunlight sensor 56 for detecting an amount of sunlight entering the passenger compartment, an evaporator temperature sensor 57 for detecting a temperature of air cooled by the evaporator 15 (i.e., a temperature of air immediately after passing through the evaporator 15), and a water temperature sensor 58 for detecting a temperature of hot water supplying to the heater core 16.

On the front seat side operation panel 52, a front seat side setting unit such as a front seat side temperature setting unit 59, a front seat side air amount setting unit 60, a front seat side air outlet setting unit 61 and an inside/outside air mode setting unit 62 are provided. Similarly, on the rear seat side operation panel 53, a rear seat side setting unit such as a rear seat side temperature setting unit 63, a rear seat side air amount setting unit 64 and a rear seat side air outlet setting unit 65 are provided.

Further, a driving unit for driving each air conditioning equipment is controlled by the ECU 50. The driving unit includes a motor 66 for driving the inside/outside air selecting doors 7, 8, the motor 12 for driving the fan 11, a motor 68 for driving the first driving shaft 24 of the air mixing film member 26, a motor 69 for driving foot air mixing doors 37a, 37b, a motor 70 for driving the rear air mixing door 41, a motor 71 for driving the second driving shaft 43 of the air outlet mode film member 45, and a motor 72 for driving the hot water valve 16.

Next, a control of the ECU 50, for automatically correcting a door position, will be now described.

First, a temperature difference between upper and lower sides in the passenger compartment is set in the bi-level mode.

In the bi-level mode, it is compared with the foot mode and the foot/defroster mode, each operation position of the foot air mixing doors 37a, 37b is corrected at the maximum heating side, or the operation position of the air mixing film member 26 is corrected at the maximum cooling side to obtain the temperature difference between upper and lower sides in the passenger compartment. Therefore, the amount of warm air toward the foot air outlet or the amount of cool air toward the face air outlet is increased. Thus, in the bi-level mode, a temperature difference can be provided between the upper and lower sides in the passenger compartment compared with the case in the foot mode and the foot/defroster mode.

Further, in the bi-level mode, a temperature difference between the upper and lower sides in the passenger compartment can be set even when the ratio between the amounts of air blown toward the upper and lower sides in the passenger compartment is changed. In the bi-level mode, by stepwise or continually changing the operation position of the air outlet mode film member 45, the opening areas of the face opening portions 20, 21 and the opening areas of the foot warm air opening portion 32a, 32b for the foot opening portion 22 are stepwise or continually changed; and therefore, the ratio between the amounts of air blown toward the upper and lower sides in the passenger compartment can be changed. In this case, when the amount of air blown toward the face outlet is made larger by increasing the opening area of the face opening portions 20, 21, the opening area the warm air opening portions 32a, 32b is reduced. Therefore, the amount of warm air blown toward the foot air outlet is decreased, and the temperature difference of air blown toward the upper and lower sides becomes smaller. However, by correcting each operation position of the foot air mixing doors 37a, 37b to the maximum heating side, the temperature of air blown toward the foot air outlet can be increased at a predetermined temperature to maintain the temperature difference between upper and lower sides in the passenger compartment. Conversely, when the amount of air blown toward the face air outlet becomes smaller, the operation position of the air mixing film member 26 may be corrected at the maximum cooling side.

Next, in the bi-level mode, the foot mode or the foot/defroster mode, when the upper and lower side temperatures in the passenger compartment are independently controlled when sunlight is irradiated to the upper portion of a passenger in the passenger compartment in the winter, the operation position of the air mixing film member 26 is changed to the maximum cooling side, and each operation position of the foot air mixing doors 37a, 37b is corrected to move to the maximum heating side.

When the operation position of the air mixing film member 26 is moved to the maximum cooling side, the opening area of the foot warm opening portions 32a, 32b for the foot opening portion 22 is reduced to reduce the amount of warm air toward the foot air outlet. However, because each operation position of the foot air mixing doors 37a, 37b are corrected to move to the maximum heating side, it can prevent the temperature of air blown toward the foot air outlet from be lowered. Thus, when sunlight is irradiated to the upper portion of a passenger in the passenger compartment in the winter, an air-conditioning feeling for the passenger in the passenger compartment can be improved.

Next, the temperature of air blown toward the front seat side in the passenger compartment and the temperature of air blown toward the rear seat side in the passenger compartment are independently controlled. First, a case where the temperature of air blown toward the rear seat side in the passenger compartment is maintained at a temperature when the temperature of air blown toward the front seat side is changed will be now described. In this case, when the operation position of the air mixing film member 26 is changed to the maximum cooling side to increase the amount of cool air toward the first air mixing chamber 31, the operation position of the rear air mixing door 41 is corrected to move to the maximum heating side. On the other hand, when the operation position of the air mixing film member 26 is changed to the maximum heating side to reduce the amount of cool air in the first cool air bypass passage 17, the operation position of the rear air mixing door 41 is corrected to move to the maximum cooling side. That is, in this case, the variation of the amount of air toward the rear seat side in the passenger compartment due to the variation of the operation position of the air mixing film member 26 can be offset by correcting the operation position of the rear air mixing door 41.

On the other hand, when each operation position of the air mixing door 37a, 37b is changed at the maximum cooling side to increase the amount of cool air flowing into the second air mixing chambers 36a, 36b, the opening area of the foot warm air opening portions 32a, 32b is reduced by the foot air mixing doors 37a, 37b; and therefore, the amount of warm air toward the rear warm air opening portion 33 becomes larger. In this case, by correcting the operation position of the rear air mixing door 41 to the maximum cooling side, it can prevent the temperature of air blown toward the rear seat side from being increased. Conversely, when each operation position of the air mixing door 37a, 37b is changed at the maximum heating side to increase the amount of warm air flowing into the second air mixing chambers 36a, 36b, it can prevent the temperature of air blown toward the rear seat side in the passenger compartment from being lowered by correcting the operation position of the rear air mixing door 41 at the maximum heating side.

When the air mixing film member 26 and the foot air mixing doors 37a, 37b are simultaneously operated, the door position is corrected as the following method. That is, when each operation position (opening degree) of the air mixing film member 26 and the air mixing doors 37a, 37b is in a range (e.g., 0/10–4/10) at the maximum cooling side, the effect of the air mixing film member 26 is larger than that of the air mixing doors 37a, 37b. Therefore, when the air mixing film member 26 is moved to the maximum cooling side, the operation position of the rear air mixing door 41 is corrected to move to the maximum heating side. On the other hand, when each operation position of the air mixing film member 26 and the air mixing doors 37a, 37b is in a range (e.g., 6/10–10/10) at the maximum heating side, the effect of the foot air mixing doors 37a, 37b is larger than that of the air mixing film member 26. Therefore, when the foot air mixing doors 37a, 37b are moved to the maximum cooling side, the operation position of the rear air mixing door 41 is corrected to maximum heating side.

Further, a case where the temperature of air blown toward the front seat side in the passenger compartment is maintained at a temperature when the temperature of air blown toward the rear seat side is changed will be now described. When the rear air mixing door 41 is moved at the maximum cooling side, the amount of cool air flowing into the third air mixing chamber (i.e., rear air mixing chamber) 40 through the second cool air bypass passage 18 is increased; and therefore, the amount of cool air flowing into the first air mixing chamber 31 is reduced. However, by correcting the operation position of the air mixing film member 26 to the maximum cooling side, it can prevent the amount of cool air flowing into the first air mixing chamber 31 from being reduced. On the other hand, when the rear air mixing door 41 is moved to the maximum heating side, it can prevent cool air flowing into the first air mixing chamber 31 from being increased by correcting the operation position of the air mixing film member 26 to the maximum heating side.

Further, when the rear air mixing door 41 is moved to the maximum cooling side, the amount of warm air toward the rear warm air opening portion 33 is reduced; and therefore, the amount of warm air flowing into the second air mixing chambers 36a, 36b may be increased. In this case, by correcting each operation position of the foot air mixing doors 37a, 37b at the maximum cooling side, it can prevent the amount of warm air flowing into the second air mixing chambers 36a, 36b from being increased. On the other hand, when the rear air mixing door 41 is moved to the maximum heating side, it can prevent the amount of warm air flowing into the second air mixing chambers 36a, 36b from being reduced by correcting each operation position of the foot air mixing doors 37a, 37b to the maximum heating side.

Although the present invention has been fully described in connection with preferred embodiments thereof with reference to the accompanying drawings, it is to be noted that various changes and modifications will become apparent to those skilled in the art.

For example, in the amove-described first and second embodiments, the film-like air mixing film member 26 is used as a first air mixing unit, and the film-like air outlet mode film member 45 is used as a front seat side air outlet mode switching unit; however, plate-like doors can be used instead of the film members 26, 45. Alternatively, instead of the plate like-foot air mixing doors 37a, 37b and the rear air mixing door 41, film-like film members may be used.

In the above-described first and second embodiments, the air mixing film member 26 and the foot air mixing doors 37a, 37b are respectively independently operated to independently control the temperature of air blown toward the upper side in the passenger compartment and the temperature of air blown toward the lower side in the passenger compartment in the bi-level mode. However, the air mixing film member 26 and the foot air mixing doors 37a, 37b may be operatively connected to cooperatively control the temperature of air blown toward the upper side in the passenger compartment and the temperature of air blown toward the lower side in the passenger compartment.

In the above-described first and second embodiments, the opening degree of the rear air mixing door 41 is independently adjusted relative to the air mixing film member 26 and the foot air mixing doors 37a, 37b to independently control the temperature of air blown toward the front side in the passenger compartment and the temperature of air blown toward the rear side in the passenger compartment. However, the rear air mixing door 41 may be operatively linked with the film members 26, 37a, 37b to cooperatively control the temperature of air blown toward the front side in the passenger compartment and the temperature of air blown toward the rear side in the passenger compartment.

In the above-described first and second embodiments, the hot water valve 16b for adjusting the amount of hot water flowing into the heater core 16 is provided. However, the present invention may be applied to an air conditioning apparatus where hot water always circulates in the heater core 16 when the engine of the vehicle is driven.

Further, in the second embodiment, when the maximum cooling mode is set at the front seat side and the temperature control area is set at the rear seat side from the maximum cooling mode, the operation position of the air mixing film member 26 may be changed according to the opening degree of the rear air mixing door 41. That is, according to the increase of the opening degree of the rear air mixing door 41 (i.e., the opening degree of the rear warm air passage 35), the heater core opening area due to the supplementary opening portion 26b may be increased.

Such changes and modifications are to be understood as being within the scope of the present invention as defined by the appended claims.

What is claimed is:

1. An air conditioning apparatus for a vehicle having a passenger compartment, said air conditioning apparatus comprising:

an air conditioning case for forming an air passage, said air conditioning case having a face opening portion adapter for blowing air toward an upper portion of the passenger compartment, a defroster opening portion adapter for blowing air toward a lower portion of the passenger compartment;

a cooling heat exchanger, cooling air passing through said air passage, disposed in said air conditioning case, to form a first bypass passage at one side of said heating heat exchanger and a second bypass passage at the other side of said heating heat exchanger, air having passed through said cooling heat exchanger bypassing said heating heat exchanger through said first and second bypass passage;

an air outlet mode selecting unit for opening and closing said foot opening portion;

a first air mixing unit, disposed in said air conditioning case at an upstream air side of said heating heat exchanger; and a second air mixing unit, disposed in said air conditioning case at an immediately downstream air side of said heating heat exchanger wherein;

said heating heat exchanger is disposed to form a first warm air passage and a second warm air passage branched from each other through which air having passed through said heating heat exchanger flows;

said first air-mixing unit is disposed to adjust an air amount passing through said first bypass passage an air amount passing through said first warm air passage and an air amount passing through said second warm air passage;

said second air mixing unit is disposed to adjust a ratio between an air amount from said second bypass passage and an air amount from said second warm air passage; and said air outlet mode selecting unit is disposed to only open and close said second warm air passage, among said second bypass passage and said second warm air passage;

air form said first bypass passage and air from said first warm air passage are mixed in a first air mixing chamber, and the air mixed in said first air mixing chamber is for blowing toward said face opening portion; and air from said second bypass passage and air from said second warm air passage are mixed in a second air mixing chamber provided at an immediately downstream air side of said heating heat exchanger, and the air mixed in said second air mixing chamber is for blowing toward said foot opening portion.

2. The air conditioning apparatus according to claim 1, wherein:

said air outlet mode selecting unit is disposed to open and close said face opening portion, said defroster opening portion and said foot opening portion; and each of said air outlet mode selecting unit and said first air mixing unit is a film member sliding in an up-down direction of the vehicle.

3. The air conditioning apparatus according to claim 2, wherein said first bypass passage and said first air mixing exchanger, and said second bypass passage is provided at a lower said of said heating exchanger.

4. The air conditioning apparatus according to claim 1, wherein said second air mixing unit has a plate-like door.

5. The air conditioning apparatus according to claim 1, further comprising:

means for respectively independently controlling said first air mixing unit and said second air mixing unit.

6. The air conditioning apparatus according to claim 1, wherein:

said air conditioning case includes
a third warm air passage separated from said first and second warm air passages, through which air having passed through said heating heat exchanger flows,
a third air mixing chamber for mixing air from said second bypass passage and air from said third warm air passage, and
a rear opening portion through which air from said third air mixing chamber is adapted to be blown toward a rear seat side of the passenger compartment.

7. The air conditioning apparatus according to claim 6, further comprising:

a third air mixing unit for adjusting an air amount from said second bypass passage and an air amount from said third warm air passage.

8. The air conditioning apparatus according to claim 7, wherein said third warm air passage is always opened regardless of a position of said air outlet mode selecting unit.

9. The air conditioning apparatus according to claim 1, wherein said second warm air passage and said third warm air passage are adjacently provided within said air conditioning case.

10. An air conditioning apparatus for a vehicle having a passenger compartment, said air conditioning apparatus comprising:

an air conditioning case for forming an air passage, said air conditioning case having a face opening portion adapted for blowing air toward an upper portion of the passenger compartment, and a foot opening portion adapted for blowing air toward a lower portion of the passengers compartment;

a cooling heat exchanger for cooling air passing through said air passage;

a heating heat exchanger for heating air passing therethrough, said heating heat exchanger is disposed in said air conditioning case at a downstream air side of said cooling heat exchanger, to form first and second bypass passages at both sides of said heating heat exchanger, through which air having passed through said cooling heat exchanger bypasses said heating heat exchanger, and to form a first warm air passage and a second warm air passage branched from each other, through which air having passed through said heating heat exchanger flows;

an air outlet mode selecting unit for opening and closing said foot opening portion;

a first air mixing unit, disposed in said air conditioning case at an upstream air side of said heating heat exchanger, for adjusting an air amount passing through said first bypass passage, an air amount passing through said first warm air passage and an air amount passing through said second warm air passage; and a second air mixing unit, disposed in said air conditioning case at an immediately downstream air side of said heating heat exchanger, for adjusting an air amount from said second bypass passage and an air amount from said second warm air passage, wherein;

said air outlet mode selecting unit is disposed to only open and close said second warm air passage, among said second bypass passage and said second warm air passage;

said first bypass passage and said first warm air passage are provided for leading air toward said face opening portion; and said second bypass passage and said second warm air passage are provided for leading air toward said foot opening portion.

* * * * *